INVENTOR.
RUDOLPH A. GOEPFRICH
JOSEPH L. MOSSEY
BY
*G. A. Gust*
ATTORNEY

INVENTOR.
RUDOLPH A. GOEPFRICH
JOSEPH L. MOSSEY
BY
G. A. Gust
ATTORNEY

United States Patent Office 2,762,458
Patented Sept. 11, 1956

2,762,458

SEALED BRAKE

Rudolph A. Goepfrich and Joseph L. Mossey, South Bend, Ind., assignors to Bendix Aviation Corporation, South Bend, Ind., a corporation of Delaware Application September 13, 1951, Serial No. 246,392

12 Claims. (Cl. 188—18)

The present invention relates to vehicle brake mechanism and more particularly to a brake mechanism effectively sealed against the entrance of fluids and foreign matter which might impair the operation and performance of the mechanism.

The brakes of present day vehicles are often subjected to wetting as the result of operation in rainy weather or of traveling through shallow streams or the like. It is well known that such wetting seriously affects the performance of the brakes, and common evidences of this undesired result are in one instance "brake-grab" and in another instance a sharp reduction in retarding action. Other deficiencies may eventually appear in the form of brake failure due to the accumulation of dirt and mud in the mechanism or due to the various parts rusting to the point where they become weak and breakable under normal usage.

Present day brakes are also being continuously used in dry, dusty rural areas and as a result are subjected to the exposure of dirt and dust which accumulates in and about the brake mechanisms. These accumulations produce exteremely rapid lining wear and often-times foul the wheel cylinders.

Thus, it is a principal object of this invention to provide a brake which may be used in any of the situations mentioned above without fear that the operation or performance of the brake will be deleteriously affected.

It is another object of this invention to provide a brake sealed against the ingress of fluids or foreign matter thereby preserving normal brake reliability under almost all operating conditions.

It is a further object of this invention to provide a sealed brake construction which may be economically and readily adapted to existing brake designs. The accomplishment of this object is obviously a desirable feature since the purchaser of this brake construction will obtain all of the favorable attributes of a sealed brake without suffering an appreciable increase in brake cost.

It is still a further object to provide a brake having greater wear-life characteristics than similar present day brakes.

Other objects will become apparent as the description proceeds.

Figure 1:
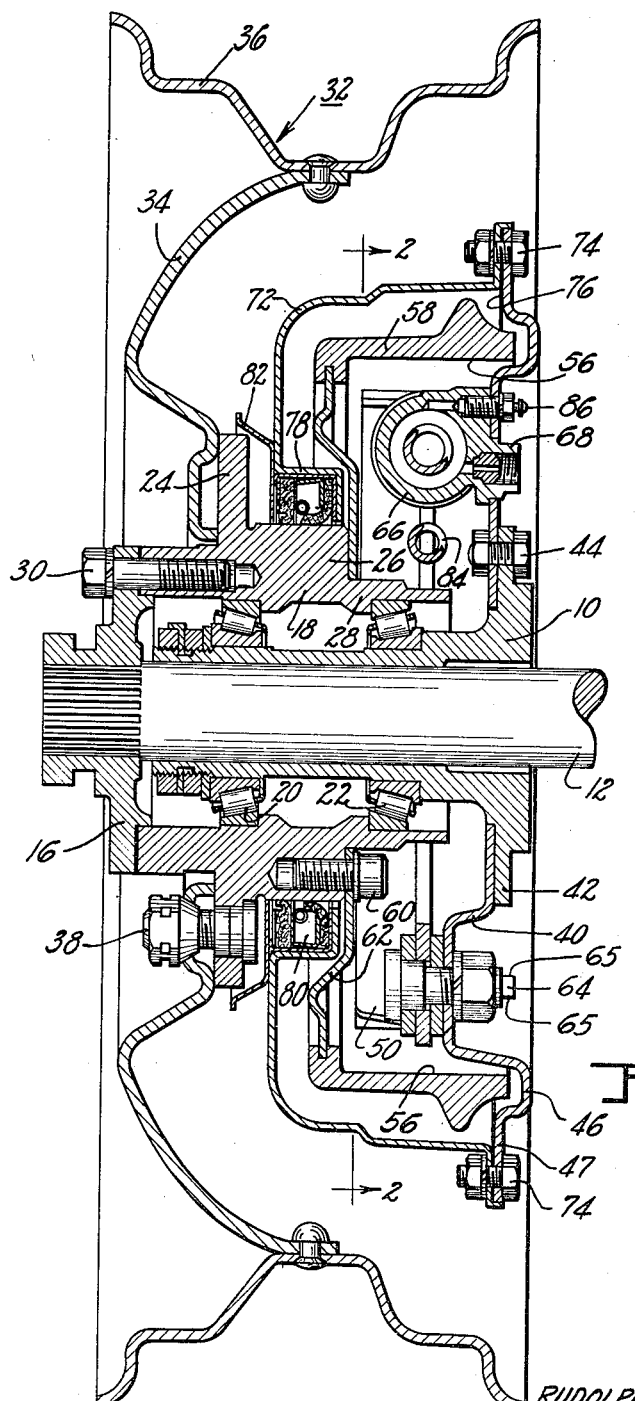
Figure 1 is an axial section of an embodiment of the present invention.
Figure 2:
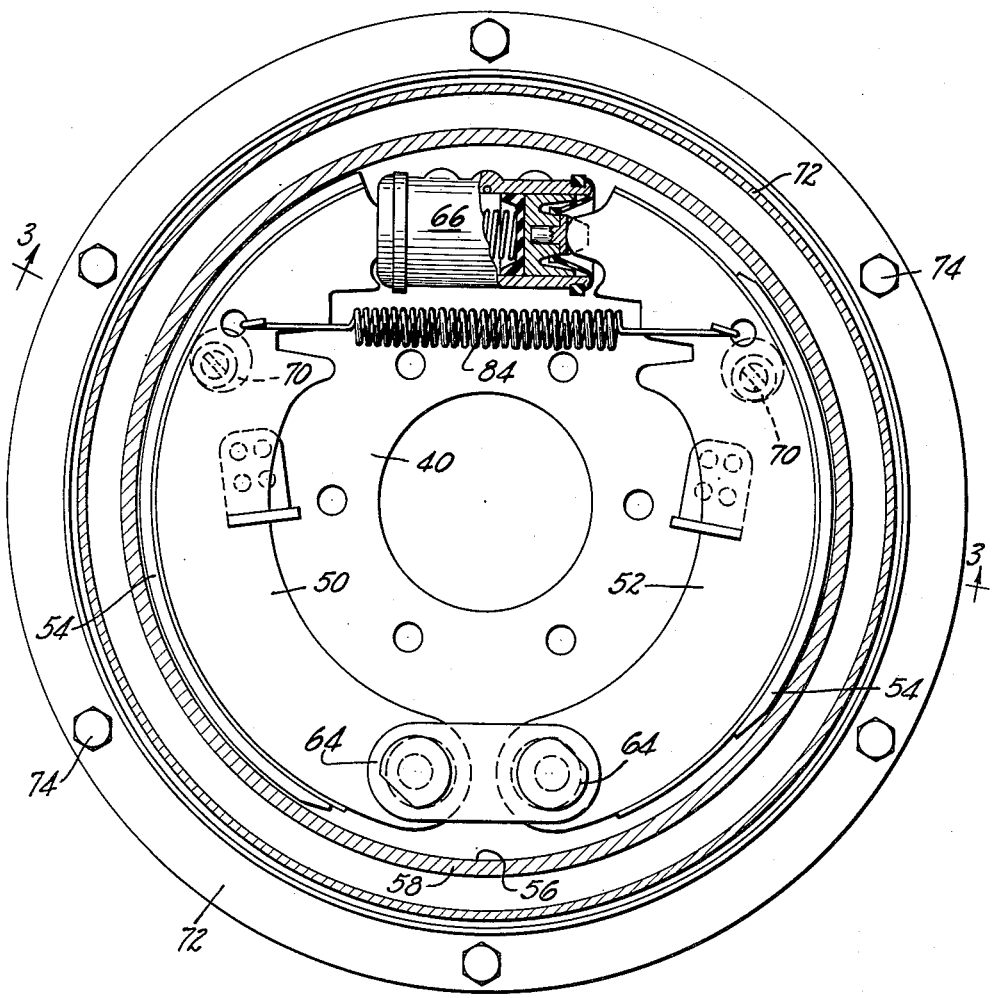
Figure 2 is an elevational view taken substantially on section line 2—2 of Figure 1.
Figure 3:
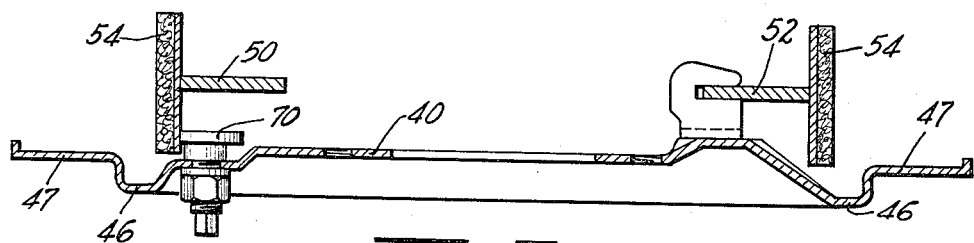
Figure 3 is a sectional view taken substantially on section line 3—3 of Figure 2.

Referring to the drawings for the specific details of an embodiment of this invention, a nonrotatable axle support or axle 10 receives therein for rotation an axle shaft 12 which is splined at its left-hand end to receive an annular drive plate 16. A wheel hub 18 is rotatably mounted on the axle support 10 by means of axially spaced bearings 20 and 22, said hub being provided with three stepped diameter portions, portion 24 having the largest diameter, portion 26 being of an intermediate diameter, and portion 28 having the smallest diameter. The left-hand end of hub 18 is secured to drive plate 16 by means of circumferentially arranged bolt 30 and is thereby rotatable with the axle shaft 12. A wheel 32 of any suitable design is mounted on hub 18 and in the particular illustrated embodiment comprises a wheel disc 34 which is secured at its outer periphery to a tire-bearing rim 36. Bolts 38 are used to secure the wheel disc 34 to the large diameter portion 24 of hub 18.

The brake backing plate or supporting member 40 is centrally secured to a flange 42 formed integral with axle 10 by means of circumferentially spaced bolts 44. It is of course necessary that this connection between member 40 and flange 42 be effective to seal out water and the like, and if preferred, a gasket (not shown) may be used for this purpose. The plate 40 is provided with an annular indention or channel 46 near its outer periphery, which merges with a radial flange 47 which lies in a plane substantially parallel to the radial inner portion of said plate 40. The purpose of this annular channel will be explained hereafter.

A friction device, which in the illustrated embodiment comprises a pair of T-section friction elements or brake shoes 50 and 52, is carried by backing plate 40. Each of these shoes may be provided with a segment of conventional composition friction lining 54 arranged for engagement with friction surface 56 of a brake drum 58, the latter being suitably secured for rotation with hub 18 as by means of a circumferential series of bolts 60 which pass through the radial portion 62 of drum 58 and into the intermediate hub portion 26. The shoes 50 and 52 are anchored at one side of backing plate 40 by means of a pair of adjustably spaced anchor posts 64 which are engaged by respective adjacent ends of said shoes. Flats 65 are preferably formed on the outer ends of said posts 64 for rotating said posts by the use of a wrench or the like. Positioned between the opposite, adjacent ends of shoes 50 and 52 is a double piston, hydraulic actuator or wheel cylinder 66 which is adapted to spread these ends for causing the shoe to frictionally engage drum 58. As will be seen more clearly in Figure 1, the conduit fitting 68 of wheel cylinder 66 projects through backing plate 40 for convenient connection to the other parts of the vehicle brake system. Two eccentric brake shoe adjustors 70 are secured to and project through the backing plate 40 to engage the inside of the rims of respective shoes 50 and 52 for the purpose of adjusting shoe-to-drum clearance.

A nonrotatable, annular, hub-shaped housing or shell 72 is secured to the flange 47 of plate 40 by means of a series of circumferentially spaced bolts 74, said housing 72 following substantially the configuration of drum 58 but being maintained in spaced relation therewith. In Figure 1 it will be seen that a fluid-tight annular seal 76 is interposed between backing plate 40 and the flange on housing 72 to prevent fluid (or the like) leakage therebetween. The radial inner portion of housing 72 is bent axially toward drum 58 to provide a cylinder portion 78 and then is formed radially inwardly at right angles to closely surround the intermediate portion 26 of hub 18. A fluid-ring seal 80 is interposed between cylindrical portion 78 and the outer surface of intermediate portion 26 to prevent leakage of fluid or other foreign matter between hub 18 and housing 72.

An annular baffle plate 82 is secured to the radial inner portion of housing 72 and is inclined radially outwardly toward wheel disc 34. It will be noted by reference to Figure 1 that an annular channel is thus provided between the baffle plate 82 and the large diameter portion 24 of hub 18, this annular portion being made of such size that it will prevent relatively large dirt particles from dropping onto the surface of intermediate portion 26 adjacent seal 80. It should also be noted that if any water or other fluid should collect in this space between seal 80 and the adjacent surface of hub portion 24, that such water or fluid will drain out the bottom thereof through the aforementioned annular passageway.

In operating the brake, assuming that the drum 58 is rotating, hydraulic pressure is injected through the fitting 68 into the wheel cylinder 66. The pistons mounted in wheel cylinder 66 are moved oppositely outwardly against corresponding ends of shoes 50 and 52 forcing said shoes into frictional engagement with braking surface 56 of drum 58. This action of course will be recognized as being conventional with internally expanding shoe type brakes, and it is to be understood at this point that while a fixed anchor, non-servo brake has been illustrated, other brake configurations may be used without departing from the true scope of this invention. Brake release is effected by relieving the hydraulic pressure communicated to cylinder 66 and by the force of the return spring 84 which draws the upper ends of shoes 50 and 52 radially inwardly out of engagement with drum 58.

This brake as illustrated and described will obviously be shielded from the deleterious effects of water, dust, etc., in which it may be operated. Since the housing 72 follows substantially the contour of drum 58, use may be made of backing plate 40 as one section of the encasement which completely encloses the brake mechanism. This of course conduces to the saving of material since plate 40 serves dual functions, viz. as a brake backing plate and as one part of the encasement. The seal 80 may be any suitable type, the important requirement being that an effective seal be obtained which will prevent the leakage of fluid between hub portion 26 and the inner periphery of housing 72.

As will be seen more clearly in Figure 1, the right-hand edge of drum 58 just enters the cavity of the channel portion 46 of backing plate 40 so that lining dust produced by wear of the brake lining may pass around the annular passage defined by the drum and the channel and fall harmlessly into the lowest space defined between the adjacent peripheral surfaces of drum 58 and housing 72.

Thus it is seen that an effective, reliable sealed brake construction is achieved by the use of a minimum of parts. Since the working parts of the brake mechanism are completely enclosed, the brake may be operated reliably and effectively even though the entire wheel and brake assembly may be completely submerged.

Another important feature not to be lost sight of is the arrangement permitting connection to and service adjustment of the brake mechanism without disturbing the encasement. Since the backing plate 40 forms one side of the encasement, convenient connection is available to fitting 68 of wheel cylinder 66, and anchor posts 64 and adjustors 70 are fully accessible for adjustment. Also, referring to Figure 1, the cylinder 66 may be bled externally of the brake by means of the conventional bleed port 86.

Although only one embodiment of the invention has been illustrated and described, various changes in the form and relative arrangements of the parts may be made to suit requirements.

I claim:

1. A brake mechanism comprising a nonrotatable axle, a wheel journaled on said axle and having hub and rim parts interconnected by means of a supporting disc, a brake cooperatively associated with said wheel and having a nonrotatable backing plate attached to said axle to form a fluid-seal therebetween, an expansible friction device carried by said plate, a hydraulic actuator also carried by said plate to actuate said friction device, said actuator having hydraulic connections which project through said plate for attachment to external parts, a rotatable brake drum carried by said hub and having a friction surface engageable with said friction device, a nonrotatable housing attached in sealing relation to the outer peripheral portion of said backing plate and formed to enclose said brake, said housing having a radial portion which closely surrounds said hub, a sealing device interposed between said radial portion and said hub and serving to prevent the passage of fluid into said housing and said brake between said hub and said housing, and a cup-shaped baffle plate secured near the inner periphery of said radial portion and being inclined radially outwardly toward said wheel, said baffle plate and a portion of said wheel providing a restricted passage communicating with said sealing device which will tend to prevent foreign particles from entering said passage but which will serve to allow fluid in said passage to freely gravitate therefrom, said baffle plate being further arranged to support said sealing device at one side.

2. A brake mechanism comprising a nonrotatable axle, a wheel hub rotatably mounted on said axle, a brake cooperatively associated with said hub and axle and having a backing plate attached to a part of said axle in such a manner as to provide a fluid-seal between said plate and said axle, an expansible friction device carried by said plate, said friction device comprising a pair of circumferentially arranged T-section brake shoes, adjustable anchorages carried by said plate and extending outwardly from the plate sides, said shoes being operatively connected to said anchorages, said anchorages being provided on the side of said plate opposite said shoes with adjusting means, a hydraulic brake actuator carried by said plate and arranged to produce radial outward expansion of said shoes, said actuator having a conduit fitting which projects through said backing plate, a rotatable brake drum carried by said hub for rotation therewith and having a friction surface arranged for selective engagement with said friction device, a nonrotatable annular cup-shaped housing having an axially extending flange which surrounds said drum and which is secured in sealing relation to the outer peripheral portion of said backing plate, the radial portion of said housing surrounding said hub being formed to provide a seal-retaining flange, a sealing device interposed between said seal-retaining flange and said hub to provide a fluid-seal between said housing and said hub, a radially outwardly extending annular shoulder carried by said hub adjacent the radial portion of said housing, and a baffle plate secured to the inner peripheral portion of said radial portion and inclining radially outwardly toward said annular shoulder to provide an annular restricted passage between said shoulder and said baffle.

3. A brake mechanism comprising a nonrotatable axle, a wheel hub rotatably mounted on said axle, a brake cooperatively associated with said hub and axle and having a backing plate attached to a part of said axle in such a manner as to provide a fluid-seal between said plate and said axle, an expansible friction device carried by said plate, said friction device comprising a pair of circumferentially arranged brake shoes, adjustable anchorages carried by said plate and extending outwardly from the plate sides, said shoes being operatively connected to said anchorages, said anchorages being provided on the side of said plate opposite said sohes with adjusting means, a hydraulic brake actuator carried by said plate and arranged to produce radial outward expansion of said shoes, said actuator having a conduit fitting which projects through said backing plate, a rotatable brake drum carried by said hub for rotation therewith and having a friction surface arranged for selective engagement with said friction device, a nonrotatable annular cup-shaped housing having an axially extending flange which surrounds said drum and which is secured in sealing relation to the outer peripheral portion of said backing plate, the radial portion of said housing surrounding said hub, a sealing device interposed between said radial portion and said hub to provide a fluid-seal between said housing and said hub, a radially outwardly extending annular shoulder carried by said hub adjacent the radial portion of said housing, and a baffle plate secured to the inner peripheral portion of said radial portion and inclining radially outwardly toward said annular shoulder to provide an annular restricted passage between said shoulder and said baffle.

4. A brake mechanism comprising a nonrotatable axle, a wheel hub rotatably mounted on said axle, a brake cooperatively associated with said hub and axle and having a backing plate attached to a part of said axle in such a manner as to provide a fluid-seal between said plate and said axle, an expansible friction device carried by said plate, said friction device comprising a pair of circumferentially arranged brake shoes, adjustable anchorages carried by said plate and extending outwardly from the plate sides, said shoes being operatively connected to said anchorages, a hydraulic brake actuator carried by said plate and arranged to produce radial outward expansion of said shoes, said actuator having a conduit fitting which projects through said backing plate, a rotatable brake drum carried by said hub for rotation therewith and having a friction surface arranged for selective engagement with said friction device, a nonrotatable annular cup-shaped housing having an axially extending flange which surrounds said drum and which is secured in sealing relation to the outer peripheral portion of said backing plate, the radial portion of said housing surrounding said hub, a sealing device interposed between said radial portion and said hub to provide a fluid-seal between said housing and said hub and a baffle plate for supporting said sealing device at one side and further providing an annular restricted chamber in cooperation with said hub.

5. A brake mechanism comprising a nonrotatable axle, a wheel hub rotatably mounted on said axle, a brake cooperatively associated with said hub and axle and having a fluid impervious supporting member attached to a part of said axle in such manner as to provide a fluid-seal between said member and said axle, an expansible friction device carried by said member and comprising circumferentially arranged friction elements, adjustable anchorages carried by said member and extending oppositely from the member sides, said elements being operatively connected to said anchorages, a hydraulic actuator carried by said member and arranged to produce radial outward expansion of said elements, said actuator having a conduit portion which projects through said member, a rotatable brake drum carried by said hub for rotation therewith and having a friction surface arranged for selective engagement with said friction device, a nonrotatable cup-shaped housing having an axially extending flange which surrounds said drum and which is secured in sealing relation to the outer portion of said supporting member, the radial portion of said housing receiving said hub therethrough, a sealing device interposed between said radial portion and said hub to provide a fluid-seal between said housing and said hub and a baffle plate supporting said fluid seal on one side and cooperating with a portion of said hub on the other side to define a restricted annular chamber.

6. A brake mechanism comprising a nonrotatable axle, a wheel hub rotatably mounted on said axle, a brake cooperatively associated with said hub and axle and having a fluid impervious supporting member attached to a part of said axle in such a manner as to provide a fluid-seal between said member and said axle, an expansible friction device carried by said member and comprising circumferentially arranged friction elements, a hydraulic actuator carried by said member and arranged to produce radial outward expansion of said elements, a rotatable brake drum carried by said hub for rotation therewith and having a friction surface arranged for selective engagement with said friction device, a nonrotatable cup-shaped housing having an axially extending flange which surrounds said drum and which is secured in sealing relation to the outer portion of said supporting member, the radial portion of said housing receiving said hub therethrough, a sealing device interposed between said radial portion and said hub to provide a fluid-seal between said housing and said hub and a cup-shaped baffle plate secured to said housing and providing at one side support for said sealing device and an annular restricted passage on the other side in cooperation with said hub.

7. A brake mechanism comprising a nonrotatable axle, a wheel hub rotatably mounted on said axle, a brake cooperatively associated with said hub and axle and having a fluid impervious supporting member attached to a part of said axle in such a manner as to provide a fluid-seal between said member and said axle, a friction device carried by said member, an actuator carried by said member, a rotatable brake drum carried by said hub for rotation therewith and having a friction surface arranged for selective engagement with said friction device, said actuator being actuable to cause frictional engagement of said friction device with said friction surface, a nonrotatable cup-shaped housing having an axially extending flange which surrounds said drum and which is secured in sealing relation to said supporting member, the radial portion of said housing receiving said hub therethrough, a sealing device interposed between said radial portion and said hub to provide a fluid-seal between said housing and said hub and a cup-shaped baffle plate for retaining said seal in operative position.

8. A brake mechanism comprising a nonrotatable axle, a wheel hub rotatably mounted on said axle, a brake cooperatively associated with said hub and axle and having a fluid impervious supporting member attached to a part of said axle in such a manner as to provide a fluid-seal between said member and said axle, a nonrotatable friction device carried by said member, a rotatable friction device carried by said hub for rotation therewith and being frictionally engageable with said nonrotatable friction device, a hydraulic actuator carried by said member and arranged to cause selective engagement of said friction devices, said actuator having a conduit portion which projects through said supporting member, a nonrotatable housing enclosing said brake and having a portion secured in sealing relation to said supporting member and having another portion which receives therethrough said hub, a sealing device interposed between said hub and said last-mentioned housing portion to provide a fluid-seal between said housing and said hub and a baffle plate axially interposed between said seal and a portion of said hub for supporting the seal and defining an annular chamber in cooperation with said hub portion.

9. A brake mechanism comprising a nonrotatable axle, a wheel hub rotatably mounted on said axle, a brake cooperatively associated with said hub and axle and having a fluid impervious supporting member attached to a part of said axle in such a manner as to provide a fluid-seal between said member and said axle, a nonrotatable friction device carried by said member, a rotatable friction device carried by said hub for rotation therewith and being frictionally engageable with said nonrotatable friction device, an actuator carried by said member and arranged to cause selective engagement of said friction devices, said actuator having a portion which projects through said supporting member, a nonrotatable housing enclosing said brake and having a portion secured in sealing relation to said supporting member and having another portion which receives therethrough said hub, a sealing device interposed between said hub and said last-mentioned housing portion to provide a fluid-seal between said housing and said hub and a cup-shaped baffle plate secured to the housing for retaining said sealing device in operative position and further providing in cooperation with said hub an annular restrictive chamber.

10. A sealed brake comprising a nonrotatable supporting member adapted to be secured in sealing relation to a nonrotatable axle, a friction device comprising two circumferentially arranged brake shoes mounted on said supporting member, a pair of spaced anchor members carried by said supporting member at one side thereof and projecting beyond the sides of said supporting member, said shoes being anchored on said anchor members, an actuator carried by said supporting member and arranged to expand said shoes radially outwardly, said actuator having operating means which projects in sealing relation through said supporting member, a nonrotatable housing having a cylindrical flange enclosing the side of said supporting member which carries the aforementioned brake parts, said flange being secured to the outer peripheral portion of said supporting member in sealing relation therewith, said housing having an inner peripheral portion adapted to be engaged by a fluid-seal and a cup-shaped baffle plate for retaining said fluid-seal in operative position.

11. A sealed brake comprising a nonrotatable supporting member adapted to be secured in sealing relation to a nonrotatable axle, a friction device mounted on said supporting member, an actuator carried by said supporting member and having operative connection with said friction device, said actuator having operating means which projects in sealing relation through said supporting member, and a nonrotatable housing having a cylindrical flange enclosing the side of said supporting member which carries the aforementioned brake parts, said flange being secured to the outer peripheral portion of said supporting member in sealing relation therewith, said housing having an inner peripheral portion adapted to be engaged by a fluid-seal and a cup-shaped baffle plate secured to said housing for retaining said fluid seal in operative position and further being so constructed and arranged to cooperate with a portion of said hub to form an annular restricted chamber.

12. A sealed brake comprising a nonrotatable supporting plate adapted to be secured in sealing relation to a nonrotatable part of a vehicle, said plate having a substantially flat central portion which joins at its outer periphery a laterally projecting annular channel portion, the outer peripheral edge of said channel portion terminating in a radial flange which lies in a plane substantially parallel to said central portion, an expansible friction device carried by said supporting plate, a rotatable cylindrical drum arranged to be frictionally engaged by said friction device, the open-end-edge of said drum projecting into the cavity of said channel portion, a nonrotatable cup-shaped housing having a flange which is secured in sealing relation to the radial flange of said supporting plate, said housing and said supporting plate serving to enclose said drum and said friction device and a cup-shaped baffle plate for retaining a sealing device between said hub and said housing.

References Cited in the file of this patent
UNITED STATES PATENTS

| | | |
|---|---|---|
| 1,860,959 | Schnell | May 31, 1932 |
| 1,878,855 | Johnston | Sept. 20, 1932 |
| 1,972,394 | Radford | Sept. 4, 1934 |
| 2,013,945 | Babbitt | Sept. 10, 1935 |
| 2,094,160 | Oldberg | Sept. 28, 1937 |
| 2,113,608 | Waller | Apr. 12, 1938 |